(12) United States Patent
Litvin

(10) Patent No.: US 6,563,646 B1
(45) Date of Patent: May 13, 2003

(54) PORTABLE LASER LAYOUT INSTRUMENT

(75) Inventor: Timothy J. Litvin, Santa Cruz, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/040,507

(22) Filed: Dec. 28, 2001

(51) Int. Cl.[7] .......................... G02B 27/10; G02B 27/14
(52) U.S. Cl. ...................................... 359/618; 359/636
(58) Field of Search ................................ 359/618, 629, 359/633, 636

(56) References Cited

U.S. PATENT DOCUMENTS

| 543,730 | A | 7/1895 | Heap |
|---|---|---|---|
| 3,452,207 | A | 6/1969 | Tsukkerman |
| 3,663,890 | A | 5/1972 | Schulthess et al. |
| 5,144,487 | A | 9/1992 | Hersey |
| 5,408,553 | A | 4/1995 | English, Jr. et al. |
| 5,459,932 | A | 10/1995 | Rando et al. |
| 5,500,524 | A | 3/1996 | Rando |
| 5,617,202 | A | 4/1997 | Rando |
| 6,005,716 | A | 12/1999 | Ligtenberg et al. |
| 6,154,319 | A | 11/2000 | Rando et al. |
| 6,327,090 | B1 | 12/2001 | Rando et al. |
| 2002/0054433 | A1 * | 5/2002 | Tacklind et al. ............ 359/618 |

FOREIGN PATENT DOCUMENTS

| DE | 2738348 | 3/1978 |
|---|---|---|
| DE | 3502382 | 9/1985 |

\* cited by examiner

*Primary Examiner*—Scott J. Sugarman
(74) *Attorney, Agent, or Firm*—Thomas M. Freiburger

(57) ABSTRACT

A laser beam projecting instrument primarily for construction purposes, and preferably self-leveling, produces four or five orthogonal output beams. The high-intensity central portion of a collimated elliptical beam from a laser diode is partially diverted by a beam splitter periscope device to produce one output beam, and the remainder of that central beam region is transmitted to produce another output beam in the straight-a-head direction. Two additional beams are produced from outer portions the beam's long dimension. In another embodiment, a five-beam instrument utilized two such periscopes in succession, thus producing three beams from the high intensity central region of the collimated beam.

10 Claims, 6 Drawing Sheets

PORTABLE LASER LAYOUT INSTRUMENT

BACKGROUND OF THE INVENTION

The invention concerns portable laser-projecting instruments useful particularly in construction layout, and more specifically with such an instrument producing at least four orthogonal output beams which can be of generally balanced intensity and preferably with all beams of uniform shape and originating from the same apparent point. The instrument may be self-leveling.

A variety of optical schemes have been disclosed for producing multiple output beams for a construction layout tool, from the beam of a single laser diode. U.S. Pat. Nos. 5,500,524, 5,617,202, 6,005,716, 6,154,319 and 6,327,090 show various arrangements for dividing a beam spatially into two, three, four or five beams, each output beam taking a portion of the cross section of the collimated laser diode beam, and some of these patents show combinations of such spatial beam division and the use of conventional beam splitters that reflect a desired portion of the light's intensity and transmit the remainder. U.S. Pat. No. 5,144,487 describes a system for producing five output beams from a single collimated laser diode beam, using beam splitter optics.

In addition, a number of patents have shown the use of spatial beam division for laser or other light beams, for various purposes, most of which are unrelated to that of the present invention. See U.S. Pat. Nos. 543,730, 3,452,207, 3,663,890, 5,408,553, and German patents Nos. 2,738,348 and 3,502,382.

Beam splitter periscopes, generally of the type used in the invention, are known in binocular microscopes, to produce a binocular image from a single image. They have not been known in the context of laser tools.

Portable laser tools of the type generally contemplated in the present invention are useful particularly for layout purposes, especially construction layout. In one form, as in the present invention, these laser layout instruments have included a self-leveling feature, with an internal pendulum-like suspension for the laser and at least some of the optics. These have included true pendulums as in U.S. Pat. No. 5,144,487 and tilt compensation mechanisms as in U.S. Pat. No. 5,459,932. Thus, despite small tilt angles of the instrument's housing when placed on sloped or uneven surfaces, such an instrument produces two, three, four or five orthogonal output beams, all substantially accurate level or plumb beams.

SUMMARY OF THE INVENTION

According to this invention, an instrument producing multiple laser output beams for layout purposes is designed to optimize desired beam intensity for the beams involved. The beam intensity for four or five output beams can be approximately equal or one or more beams can be produced with greater intensity for use at longer distances. In one embodiment, a laser instrument producing four output beams utilizes an oblong or elliptical beam cross section as produced by typical laser diodes even after collimation, and directs this oblong beam against a reflective element having three 45°-angled reflective facets. A beam-transmissive center portion of the reflective element, preferably a hole, is aligned between two opposed reflective facets, and a further reflective facet is included laterally to the side of the center hole. The oblong collimated beam preferably is centered on the central transmission hole, which takes up nearly the entire width of the beam's cross section on the smaller axis. Two outer portions of the collimated beam, i.e., at the outer ends of the long axis, strike the two angled facets which are aligned with the center hole and produce two oppositely directed beams.

At the center hole or transmission area, where the beam's intensity is greatest, not all of this beam region is allowed to pass through. A beam splitter periscope device is positioned before the center hole, diverting a preselected portion of the beam's power in the center beam region, outwardly and then parallel to the collimated beam, then striking the other reflective facet to produce a side output beam. The power of the beam thus produced can be balanced with the power of the beam portion passing through the hole if desired, or intensity can be apportioned otherwise. In addition, the other two beams can be balanced against the transmitted beam and the periscope-produced beam, by adjusting the geometry of the reflective element.

To produce the cleanest output beams, similar in cross section and compact in size, masking may be employed for some or all beams. In one form the masking comprises circular apertures in a plate interposed in the path of the collimated beam, just before the beam reaches the reflective element.

In another embodiment five beams are produced using two beam splitter periscope devices in series in front of the reflective element. The geometry can be varied to collect more of the center beam region for purpose of dividing this region into three beams, if the five beams are to be generally balanced in intensity.

The system described preferably is included in a self-leveling laser projecting instrument, although other uses are possible. Such an instrument has the laser diode and optics pendulously suspended in a housing, either a true pendulum or tilt compensation arrangement as shown in U.S. Pat. No. 5,459,932. That patent and U.S. Pat. No. 5,144,487 are incorporated herein by reference regarding inclusion of the present optics in a self-leveling instrument.

It is thus among the objects of the invention to provide a laser layout instrument with multiple orthogonal output beams, preferably four or five, with optimal beam power (orthogonal as used herein means at 90° or 180° to one another). These and other objects, advantages and features of the invention will be apparent from the following description of a preferred embodiment, considered along with the accompanying drawings.

DESCRIPTION OF PREFERRED EMBODIMENTS

Figure 1:
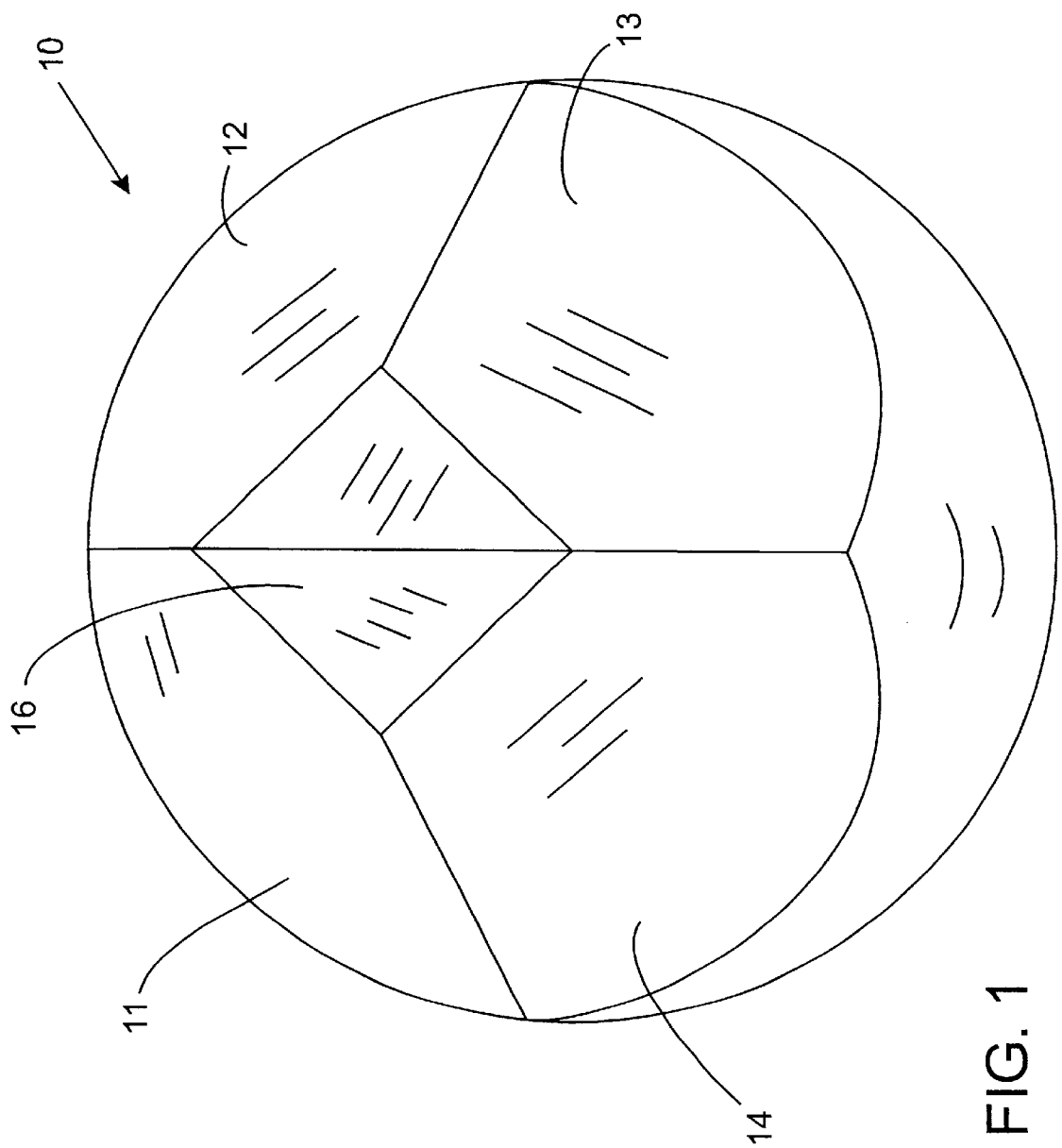
FIG. 1 is a perspective view showing a generally pyramid shaped reflector element which may form a part of the invention.

In the drawings, FIG. 1 shows a reflector element 10 generally in the shape of a truncated pyramid, with four precision-machined facets 11, 12, 13 and 14. The reflective element 10 is similar to the reflective element 72 shown in U.S. Pat. No. 6,154,319 issued Nov. 28, 2000, the disclosure of which is incorporated herein by reference. As in that patent, the element could be glass, metal or other suitable material. In the case of the element 10 of FIG. 1, it is shown as a round element with the four flat machined faces 11–14. The center region or central portion 16 of the element 10 comprises a hole, in this case a square through hole 16 (but which could be round or another shape). In the case of the glass reflector element, the glass transmits and thus no hole is needed. This transmission area is for passing a portion of a collimated laser light beam, from the center region of the laser beam, through the element 10 as an output beam. Although the element 10 is shown with four facets 11–14, for purposes of the first embodiment described herein the element can have only three facets; one facet is not used in the first embodiment. It can be envisioned from FIGS. 1, 2 and 3 that the portion of the element 10 having the facet 11 could be eliminated, so long as the active, utilized portions of the facets 12 and 14 are retained. However, the four-facet element 10 can be used if desired for convenience in manufacture, since the second embodiment described below produces five output beams and utilizes all four reflective facets 11–14 and thus the same element could be used for both optical systems.

The solid element 10 is preferred, but it could be replaced by a plurality of mirror elements mechanically fixed to a body.

Figure 2:
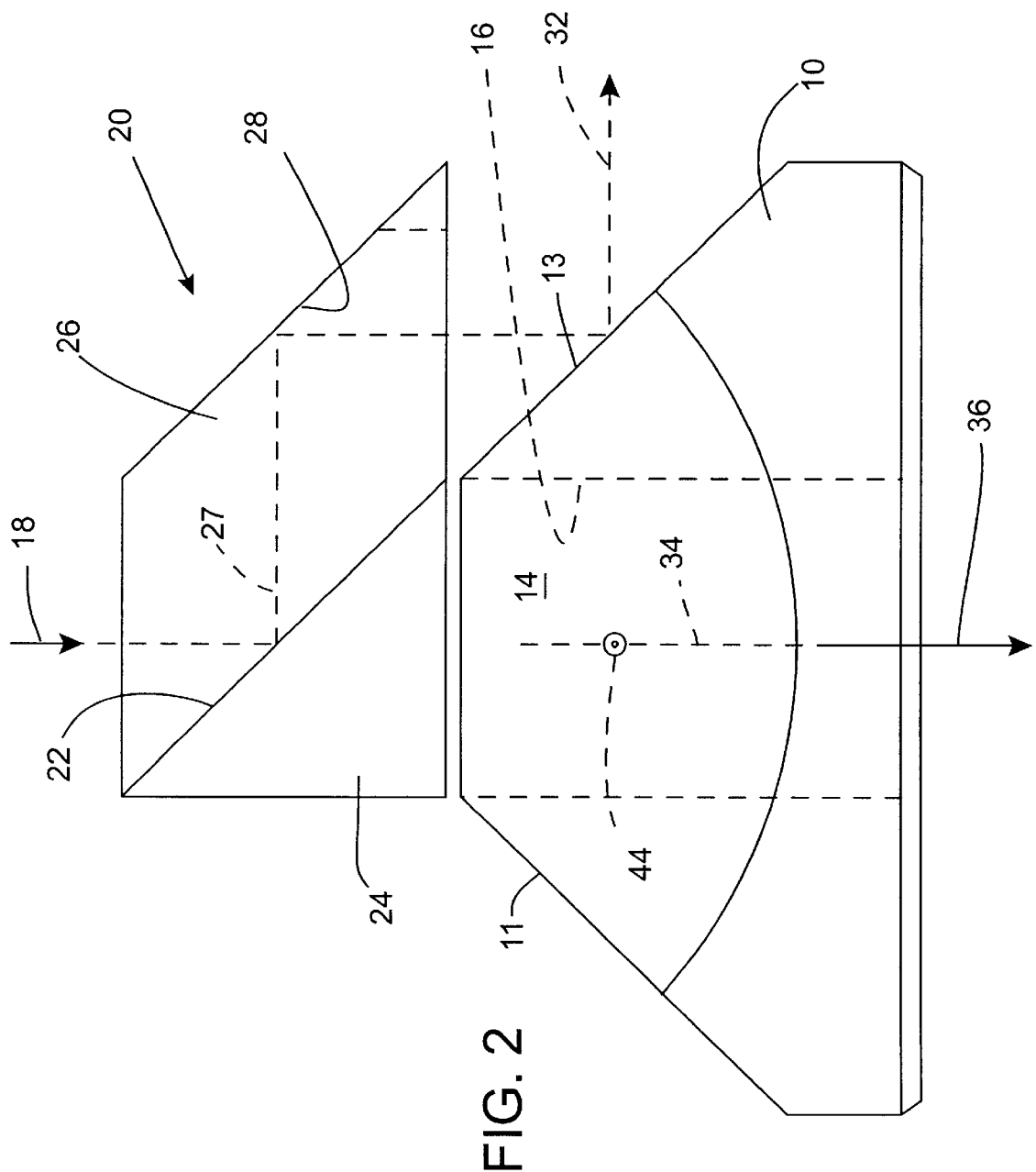
FIG. 2 is a side view showing a pyramid type reflector element with a beam splitter periscope in accordance with the preferred embodiment of the invention.

FIG. 2 shows an implementation of the invention in a first embodiment. This view can be considered a plan view or an elevation view depending on the orientation of a laser beam and the illustrated optical components within a housing of a portable laser projecting instrument with which the invention is concerned. References herein to up, down, horizontal, vertical, left, right, etc. should not be taken as limiting but as convenient references for relative positions and relationships in the embodiments described. Any desired orientation is possible.

The generally pyramid-shaped reflector element 10 is seen with its facets 11, 13 and 14 visible and the facet 12 behind. A collimated laser beam approaches the reflector essentially along the line of the arrow 18 in FIG. 2. Directly in front of the pyramid reflector 10 is a beam splitter periscope device 20, which could be several elements mounted in position but which preferably comprises a glass rhomboid beam splitter periscope, as illustrated. The device 20 includes a first reflector comprising a beam splitter 22 positioned directly over the opening 16 (or transmissive area of a glass element) through the element 10. This beam splitter 22 may be formed at the interface of two separate glass optical elements 24 and 26 that form the device 20. The element 24 may be a separate part from the rhomboid 26 but provides a flat surface for mounting the composite device 20 and retains the rhomboid 26 such that the transmitted beam is substantially parallel to the collimated beam. Appropriate coating is used so that the rhomboid's beam splitter face 22 transmits the desired portion of the power of the central region of the laser beam, and reflects essentially the remaining portion, to the right as seen in FIG. 2 to be reflected off another facet 28 of the rhomboid/periscope device, via total internal reflection. Alternatively the rhomboid could be coated at 28 with a reflective material.

The reflected portion is redirected by the internal reflection in a direction parallel to the original input collimated beam 18, to strike the reflective facet 13 as shown in the drawing and then to form an output beam 32 directed to the right as seen in FIG. 2, as one of four orthogonal output beams.

The transmitted part of the central region of the beam 18 passes through the element 24 and through the transmission bore or hole 16 (or transmissive center of a glass element) as shown at 34, to emerge as another orthogonal output beam 36, essentially aligned with the input collimated beam 18. As noted above, the proportion of the central beam region intensity can be selected and balanced between the output beams 32 and 36, such that they are equal or with one beam having a higher intensity, if desired for particular applications. If the laser diode and collimating lens (not shown) are mounted horizontally within the housing, preferably in a pendulous mount for self-leveling as noted above, as is preferred, then the output beam 36 will be a horizontal beam, useful along with another horizontal beam for squaring layout situations. Other orientations can be used.

Figure 4:
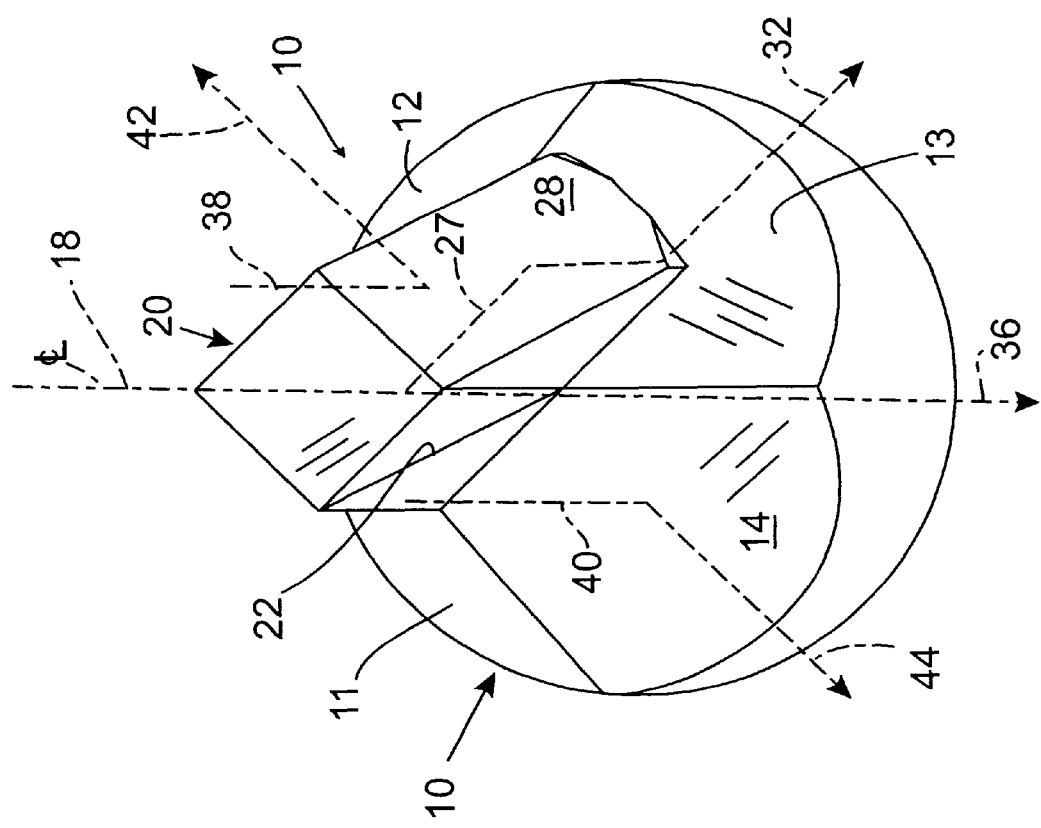
FIG. 4 is a perspective view showing the periscope and reflector elements.
Figure 3:
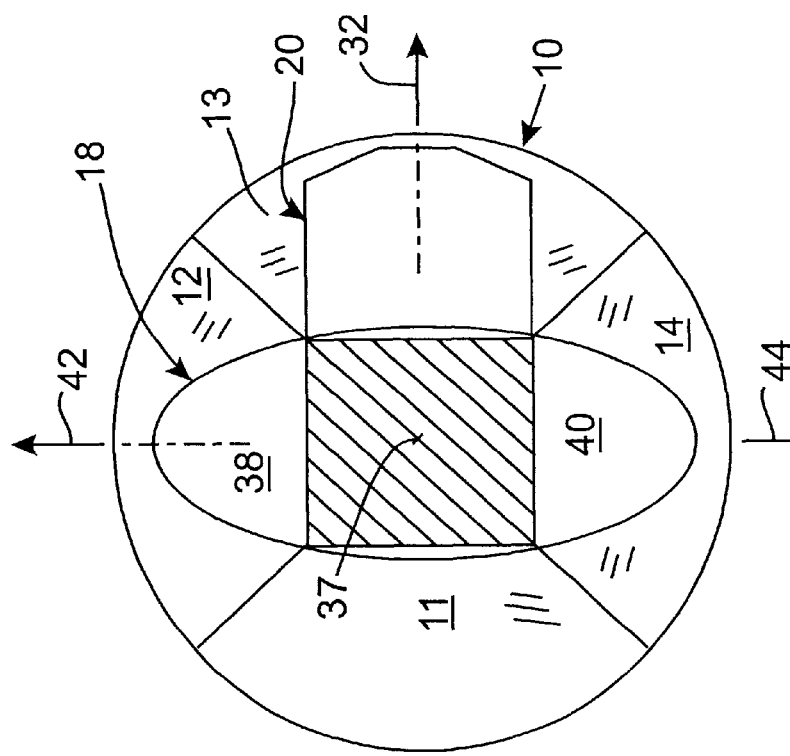
FIG. 3 is an end view (as seen by the approaching laser beams) showing the reflector element and periscope combination of FIG. 2.

Two additional beams are produced by the optical assembly shown in FIGS. 2, 3 and 4. As illustrated in FIG. 3, the collimated beam 18 normally comprises an oblong or elliptical beam shape, as generated by available reasonably-priced laser diodes, even after collimating and effectively cropping out a non-useful portion of the total laser beam. This collimated beam 18 is projected onto the pyramid reflector element 10 preferably essentially as shown, with the center beam region 37 (having the highest beam intensity) covering the central region 16 of the element, i.e. preferably covering the through opening, and this through opening preferably occupying nearly the entire width of the laser beam as shown, i.e. the width along the narrow axis of the oblong cross section. Outer ends 38 and 40 of the oblong beam spill over and are reflected by the element's reflective facets 12 and 14 as shown. This produces two additional oppositely directed output beams, beams that are orthogonal relative to the other two beams 32 and 36. These output beams can comprise an upwardly directed beam 42 and a downwardly directed beam 44, although the entire assembly can be rotated from the position shown in FIG. 3, so that only one vertical beam and two oppositely directed horizontal beams are produced, in addition to the straight-ahead beam 36 shown in FIG. 2; or the collimated beam can be vertical, producing three level beams and one vertical (straight-ahead) beam.

In FIG. 3 the beam splitter periscope device 20 is shown in front of the reflective element 10, FIG. 3 being from the point of view of the approaching collimated beam. The drawing shows the collimated beam area striking the beam splitter 22 as shaded, with the reflected part of the beam reflected two additional times as shown in FIG. 2 and eventually emerging as the beam 32, which can be the right beam of the series of orthogonal beams emanating from the instrument.

The perspective view of FIG. 4 indicates generation of all four beams 32, 36, 42 and 44. The beam center line of the approaching collimated beam is shown at 18, while outer portions of the same beam are indicated at 38 and 40, forming the two opposed orthogonal beams 42 and 44 as indicated. Preferably, the geometry of the periscope beam splitter 20 is chosen so that the distance of the approximate center of each of the outer beam portions 38 and 40 from the center line of the approaching beam shown at 18 is essentially equal to the travel length of the laterally reflected beam portion 27 between the beam splitter 22 and the internal reflective face 28. This places the three output beams 32, 42 and 44 essentially in a single plane, so that they emanate from the same point.

Figure 6:
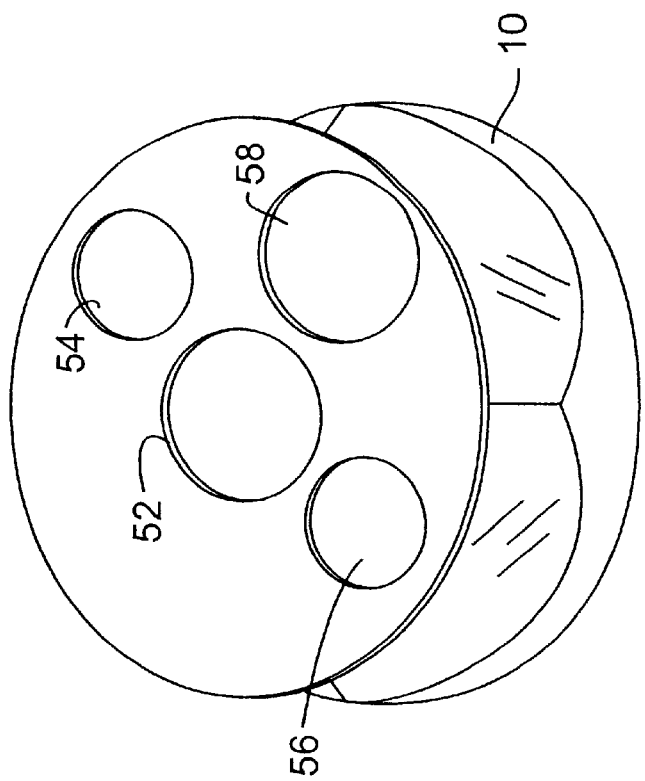
FIG. 6 is a perspective view similar to FIG. 5, but with the beam splitter periscope removed, showing a mask with four beam openings.
Figure 5:
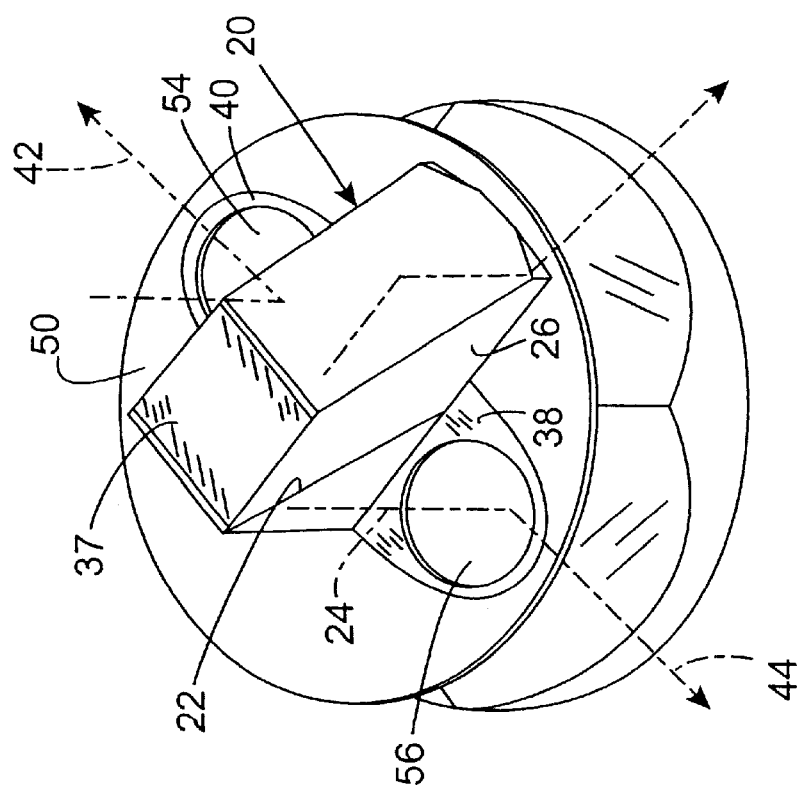
FIG. 5 is another perspective view showing the device of the invention, wherein masks are additionally included to produce output beams of sharper definition.

FIGS. 5 and 6 show an arrangement in one preferred embodiment wherein the beams are cropped or apertured to form cleaner, more sharpe-edged and more compact output beams. As FIG. 6 shows (with the rhomboid splitter element removed for clarity), a mask 50 is positioned over the generally pyramid shaped reflective element 10, and has four beam cropping holes 52, 54, 56 and 58. The size of these four holes can be unequal, as determined by beam shape approaching the aperture and by desired beam power. FIG. 5 shows the beam splitter periscope 20 positioned over the mask or aperture plate 50, showing two of the apertures 54 and 56 and the others being hidden. FIG. 5 indicates with shade lines the collimated beam intersection with the optic assembly, thus showing the center beam region 37 covering or essentially covering the top face of the periscope device 20 and the outer beam regions 38 and 40 striking the aperture plate as shown, covering the apertures or masking holes 54 and 56. The apertures are selected to obtain the maximum power possible from these beam portions while also attaining the desired clean cross section and compact beam shape. The beam splitter within the device 20 may be precisely the same size and shape as the central hole 16 in the pyramid reflector, or it can be slightly larger, but not so large as to interfere with generation of the opposed beams 42 and 44.

The assemblies shown in FIGS. 2–4 and in FIGS. 5 and 6 are relatively simple and are easily made. The rhomboid beam splitter element 26 actually forms the beam splitter and periscope, with the additional triangular glass element 24 added (glued together with the rhomboid) for ease of assembly, making a planar surface for engaging against the pyramid reflector element or against the mask or aperture plate 50. The element 24 assures correct orientation of the rhomboid splitter to provide correct alignment for the transmitted, straight-ahead beam. The device 20, the mask and the reflector element 10 can be retained together by adhesive or various mechanical structures. The rhomboid beam splitter has several advantages. Glass is a very stable material, and the surface angles affecting the beam will not change relative to each other with temperature changes. The system also is not sensitive to small changes in the orientation of the periscope device 20, since a pair of reflecting parallel surfaces is involved. This insensitivity is an important feature, obviating the need for very precise alignment during production, and important for the stability and accuracy of the beams over the life of the unit, superior in that respect to the use of plate beam splitters.

If desired, four output beams of nearly equal power can be produced using this method and arrangement. The beam power in the center beam region is roughly twice that in the outer portions of the collimated elliptical beam. With tuned aperture sizes, the power of each beam can be balanced with the rest. This is an efficient and effective way of distributing power into a pattern that is useful for producing four orthogonal output beams for layout purposes.

The illustrated arrangement comprises a combination of spatial beam splitting and the more conventional power splitting via beam splitters, although no single element in the assembly actually intercepts the entire beam as in conventional power splitting. With this preferred arrangement, different portions or zones of the collimated beam are selected for distribution into the different output beams.

Figure 7:
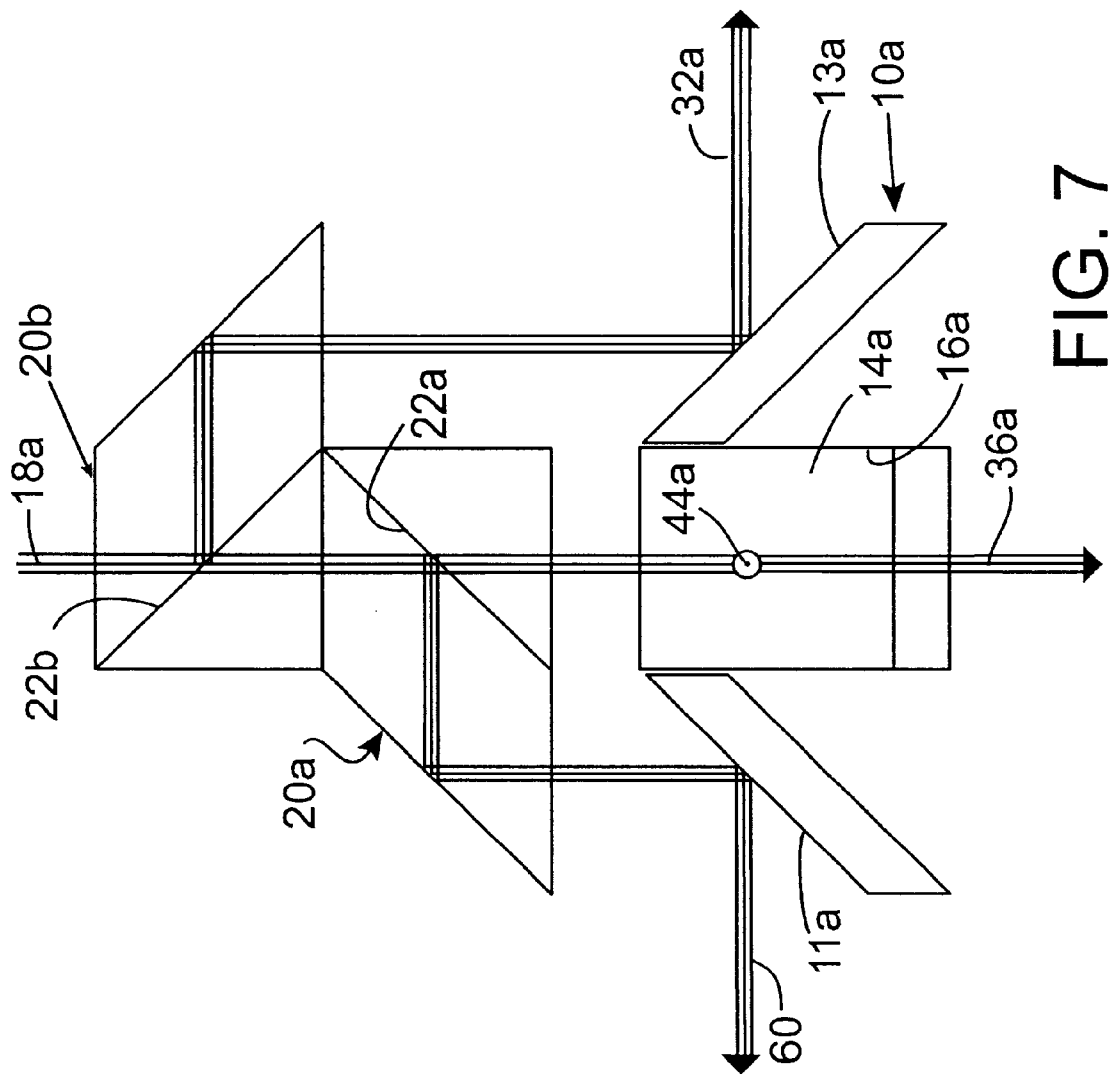
FIG. 7 is a schematic side view or top view showing another embodiment of the invention, for producing five output upward light beams.
Figure 8:
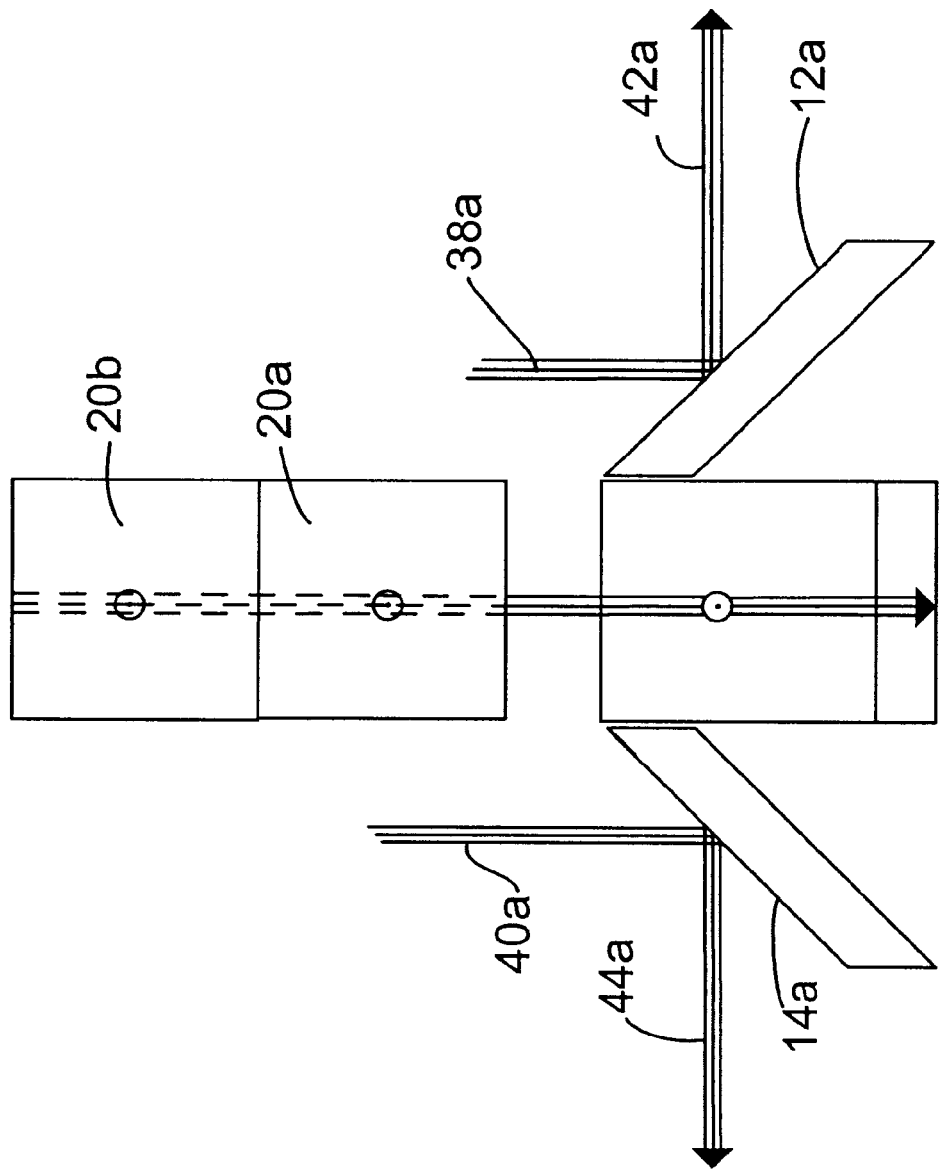
FIG. 8 is a schematic side or top view from a position at 90° from the view in FIG. 7, showing the five-output beam embodiment.

FIGS. 7 and 8 schematically show a variation wherein five output beams are produced.

FIG. 7 shows a reflector element 10*a* which, as in the earlier embodiment, can be either a single, solid element or a plurality of mirror elements mechanically fixed to a body having a central hole or transmission area. The collimated laser beam approaching the assembly is shown at 18*a*, and a pass-through output beam, which may be one of the level output beams, is shown at 36*a*. Three of the reflective facets are shown as 11*a*, 13*a* and 14*a*. The facet 14*a* receives a portion of the laser beam's cross section as at 40 in FIG. 4, producing an output beam 44*a* which points outwardly from the paper. The same situation occurs at the opposite side of the assembly, not seen in FIG. 7, producing an oppositely directed output beam similar to the beam 42 in FIG. 4.

Here, two similar periscope beam splitter devices 20*a* and 20*b* are employed, in series as shown and oppositely-oriented, in front of the reflective element 10*a*. Thus the intense central region of the collimated beam is here divided into three parts by beam splitting power dividers, thus producing output beams 32*a* and 60 as well as the pass-through beam 36*a*. Again, coatings can be used at the beam splitter interfaces 22*a* and 22*b*, selected to divide the center region's power appropriately as desired for the relative powers of the three beams thus produced. These beams may be of essentially equal power if desired. Also, the central hole or transmission area 16*a* of the reflective element can be made somewhat larger in order to capture a greater portion of the center region of the collimated beam, thereby to obtain more beam power for dividing into the three output beams, and leaving somewhat less power to be divided for the beams 42*a* and 44*a* formed by the ends of the oblong collimated beam.

FIG. 8 is a view similar to FIG. 7, but with the apparatus rotated 90° and viewed from the left or right of FIG. 7. The outer beam portions 38*a* and 40*a* are shown striking the opposed reflective facets 12*a* and 14*a* to produce the output beams 42*a* and 44*a*, and the beam splitter periscopes 20*a* and 20*b* are shown in end view. Again, cropping may be used to aperture some or all of the five beams, for the purposes described above.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A portable laser instrument for producing a plurality of substantially orthogonal output light beams, comprising:
    a laser diode and collimator lens providing a collimated laser beam,
    a reflective element positioned in the path of the collimated laser beam for producing a plurality of orthogonal laser output beams from the collimated beam, the reflective element having at least three reflective facets each positioned at angles of substantially 45° to the collimated beam and having a beam-transmitting portion through the reflective element in the path of a center beam region to pass a high-intensity central portion of the cross section of the laser beam, a periscope beam splitter positioned before the beam-transmitting center potion with a first reflector positioned over the beam-transmitting center portion and a second reflector positioned laterally outwardly relative to the collimated beam, the first reflector comprising a beam splitter transmitting a preselected portion of the beam's power in the center beam region through the reflective element to produce one output beam, and reflecting essentially a remaining portion of the center beam region's power laterally outwardly to be reflected from the second reflector in a direction essentially parallel to the one output beam and then onto one of the three 45°-angled reflective facets of the reflective element to be further reflected laterally outwardly in a direction essentially perpendicular to the one output beam, thereby to produce a second output beam, two opposed 45°-angled reflective facets on the reflective element positioned in the paths of two opposite, outer portions of the collimated beam's cross section, outward from said center beam region to produce two oppositely directed output beams each at substantially 90° to the one output beam and to the second output beam, whereby the instrument produces four essentially orthogonal output beams.

2. The laser instrument of claim 1, wherein the collimated is oblong in cross-section, with the two opposed reflective facets and the beam-transmitting portion essentially aligned with the long axis of the beam cross-section.

3. The laser instrument of claim 2, wherein the collimated beam is centered on the beam-transmitting portion.

4. The laser instrument of claim 3, wherein the reflective element is positioned such that the beam-transmitting portion receives substantially the entire width of the beam.

5. The laser instrument of claim 1, wherein the periscope beam splitter comprises a glass rhomboid beam splitter including both the first reflector and the second reflector.

6. The laser instrument of claim 1, wherein the reflective element is shaped generally as a truncated pyramid.

7. The laser instrument of claim 1, wherein the reflective element comprises a single metal component with a central hole serving as said beam-transmitting portion.

8. The laser instrument of claim 7, wherein the metal component is shaped generally as a truncated pyramid.

9. The laser instrument of claim 1, wherein the reflective element comprises a glass component with reflective coatings on the reflective facets.

10. The laser instrument of claim 1, further including a mask with apertures positioned before the reflective element, to shape the output beams.

* * * * *